United States Patent
Deshpande (10) Patent No.: US 7,135,154 B2
(45) Date of Patent: Nov. 14, 2006

(54) REACTOR MODULE FOR USE IN A COMPACT FUEL PROCESSOR

(75) Inventor: Vijay A. Deshpande, Houston, TX (US)

(73) Assignee: Texaco Inc., San Ramon, CA (US)

( * ) Notice: Subject to any disclaimer, the term of this patent is extended or adjusted under 35 U.S.C. 154(b) by 680 days.

(21) Appl. No.: 10/006,880

(22) Filed: Dec. 5, 2001

(65) Prior Publication Data

US 2002/0090326 A1    Jul. 11, 2002

Related U.S. Application Data

(60) Provisional application No. 60/251,226, filed on Dec. 5, 2000.

(51) Int. Cl.
  *F01N 3/10* (2006.01)
  *B01D 50/00* (2006.01)
  *F28D 21/00* (2006.01)
  *B28B 5/02* (2006.01)

(52) U.S. Cl. ............... 422/173; 422/177; 422/109; 422/113; 422/202; 422/203; 422/204

(58) Field of Classification Search ............ 48/61, 48/62 R, 63, 64, 86 R, 89, 93–95, 119, 118.5, 48/211, 127.9, 212, 198.7, 213, 214 R, 215, 48/214 A; 165/164, DIG. 398; 422/173, 422/177, 180, 198, 202, 203, 211, 222
See application file for complete search history.

(56) References Cited

U.S. PATENT DOCUMENTS

| | | | |
|---|---|---|---|
| 3,572,046 A | 3/1971 | Grotz | |
| 3,653,846 A | 4/1972 | Kubec et al. | |
| 3,720,602 A | 3/1973 | Riley et al. | |
| 3,729,936 A | 5/1973 | De Palma et al. | |
| 3,838,994 A | 10/1974 | Aldridge | |
| 3,909,299 A | 9/1975 | Corrigan | |
| 3,996,016 A | 12/1976 | Wagner | |
| 4,363,654 A | 12/1982 | Frederick et al. | |
| 4,483,691 A * | 11/1984 | McShea et al. | 48/202 |
| 4,522,894 A | 6/1985 | Hwang et al. | |
| 4,876,409 A | 10/1989 | Leyshon et al. | |
| 4,976,747 A | 12/1990 | Szydlowski et al. | |
| 5,132,007 A | 7/1992 | Meyer et al. | |
| 5,209,906 A | 5/1993 | Watkins et al. | |
| 5,248,566 A | 9/1993 | Kumar et al. | |
| 5,326,537 A * | 7/1994 | Cleary | 422/173 |

(Continued)

*Primary Examiner*—Alexa D. Neckel
*Assistant Examiner*—Kaity Handel
(74) *Attorney, Agent, or Firm*—Howrey LLP; Frank C. Turner; Melissa Patangia (57) ABSTRACT

A reactor module for use in a compact fuel processor having a module inlet for receiving a feed stream, a module outlet for producing an effluent stream, a reactor having a reactor inlet, a reactor outlet, and catalyst, an inlet spiral passage in fluid communication with the module inlet to the reactor inlet, and an outlet spiral passage in fluid communication with the reactor outlet to the module outlet. Such a design provides for the feed stream to be introduced to the module inlet, where it then passes through the inlet spiral passage, and is heated by hot reactor product passing through the outlet spiral passage. The reactor may be any type of fixed bed exothermic containing supported catalyst particles or the reactor bed may be a monolith with catalytic material coated on to the surface of the structural members.

13 Claims, 4 Drawing Sheets

U.S. PATENT DOCUMENTS

| | | |
|---|---|---|
| 5,330,727 A | 7/1994 | Trocciola et al. |
| 5,385,712 A | 1/1995 | Sprunk |
| 5,656,494 A | 8/1997 | Kant et al. |
| 5,725,756 A | 3/1998 | Subramaniam et al. |
| 5,874,051 A | 2/1999 | Heil et al. |
| 5,938,800 A | 8/1999 | Verrill et al. |
| 5,997,594 A | 12/1999 | Edlund et al. |
| 6,033,793 A | 3/2000 | Woods et al. |
| 6,086,839 A | 7/2000 | Autenrieth et al. |
| 6,221,117 B1 | 4/2001 | Edlund et al. |
| 6,238,815 B1 | 5/2001 | Skala et al. |
| 2002/0083646 A1 | 7/2002 | Deshpande et al. |
| 2002/0088740 A1 | 7/2002 | Krause et al. |
| 2002/0090327 A1 | 7/2002 | Deshpande |
| 2002/0090328 A1 | 7/2002 | Deshpande |
| 2002/0090334 A1 | 7/2002 | Stevens et al. |
| 2002/0094310 A1 | 7/2002 | Krause et al. |
| 2002/0098129 A1 | 7/2002 | Martin et al. |

* cited by examiner

REACTOR MODULE FOR USE IN A COMPACT FUEL PROCESSOR

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Despite the above work, there remains a need for a simple unit for converting a hydrocarbon fuel to a hydrogen rich gas stream for use in conjunction with a fuel cell.

SUMMARY OF THE INVENTION

The present invention relates to a reactor module for use with a compact fuel processor. A reactor module consistent with the present invention consists essentially of a spiral heat exchanger with a fixed bed reactor located in the core of the spiral heat exchanger. Hot reactor product gas spirals outward toward the outside channel, while the module feed enters the module at the outside channel and spirals towards the core. Countercurrent flow is thus employed between to maximize heat transfer, reduce pressure drop, and create an optimal compact modular design consistent with a compact fuel processor.

One illustrative embodiment of the present invention is an autothermal reforming module for use in a compact fuel processor having a module inlet for receiving a feed stream, a module outlet for producing an effluent stream, a fixed bed reactor having a reactor inlet, a reactor outlet, and autothermal reforming catalyst, an inlet spiral passage in fluid communication with the module inlet to the reactor inlet, an outlet spiral passage in fluid communication with the reactor outlet to the module outlet, a flow distribution manifold in fluid communication with the reactor inlet for evenly distributing flow into the reactor, and a flow collection manifold in fluid communication with the reactor for directing hot reactor product to the reactor outlet. Such a design provides for the feed stream to be introduced to the module inlet, where it then passes through the inlet spiral passage, and is heated by hot reactor product passing through the outlet spiral passage. The reactor may be a fixed bed reactor containing supported catalyst particles or the reactor bed may be a monolith with catalytic material coated on to the surface of the structural members. The autothermal reforming catalyst may include a partial oxidation catalyst and optionally a steam reforming catalyst depending on the nature of the reforming desired by the user. In such a design, the module feed stream is expected to be a gaseous mixture of air, steam, and hydrocarbon fuel.

BRIEF DESCRIPTION OF THE DRAWINGS

The description is presented with reference to the accompanying drawings in which.

DESCRIPTION OF ILLUSTRATIVE EMBODIMENTS

The present invention is generally directed to a reactor module for use in a compact fuel processor. In a preferred aspect, the apparatus described herein relates to an autothermal reforming module. However, other possible exothermic reactions are contemplated for the apparatus described herein, including any exothermic reaction used in a fuel processor to produce a hydrogen rich stream.

Each of the illustrative embodiments of the present invention describes a reactor module for use in a fuel processor with the hydrocarbon fuel feed being directed through the fuel processor. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream from of the present invention includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
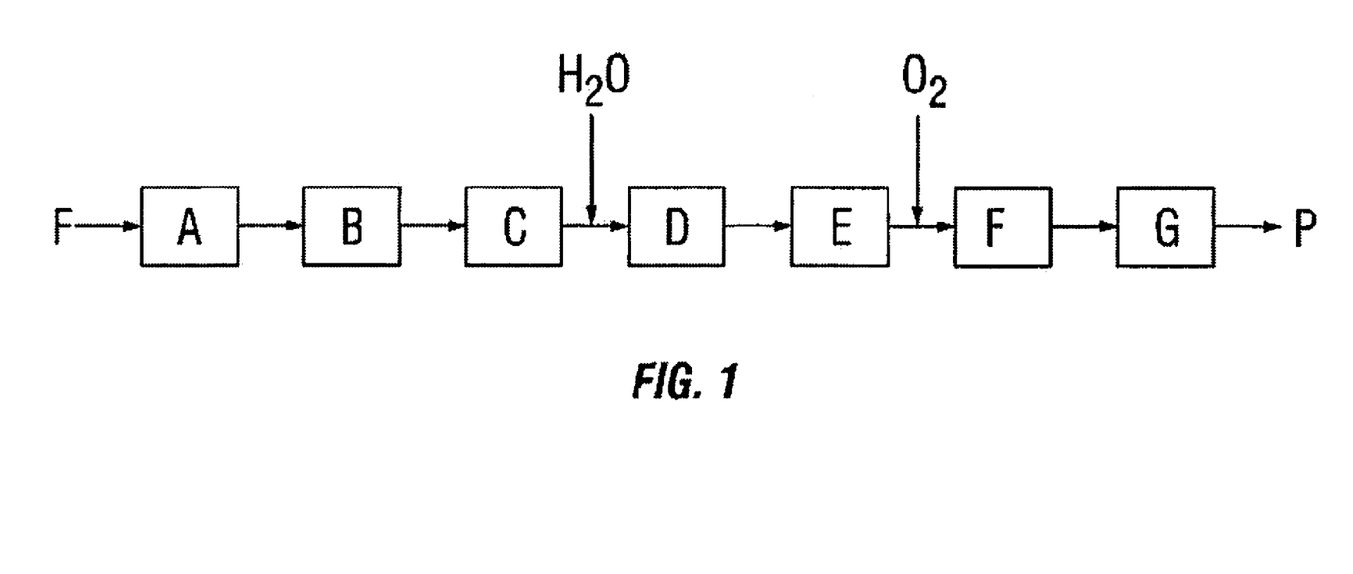
FIG. 1 depicts a simple process flow diagram for a fuel processor.

FIG. 1 depicts a general process flow diagram illustrating the process steps included in the illustrative embodiments of the present invention. One of skill in the art should appreciate that a certain amount of progressive order is needed in the flow of the reactants trough the reactors disclosed herein.

Process step A is an autothermal reforming process in which two reactions, partial oxidation (formula I, below)

and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + 1/2 O_2 \rightarrow 2H_2 + CO \tag{I}$$

$$CH_4 + H_2O \rightarrow 3H_2 + CO \tag{II}$$

The partial oxidation reaction occurs very quickly to the complete conversion of oxygen added and produces heat. The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C., to about 900° C., depending on the feed conditions and the catalyst. The invention uses a catalyst bed of a partial oxidation catalyst with or without a steam reforming catalyst. The catalyst may be in any form including pellets, spheres, extrudate, monoliths, and the like. Partial oxidation catalysts should be well known to those with skill in the art and are often comprised of noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. One illustrative embodiment for step B is the use of a heat exchanger utilizing feed stream F as the coolant circulated through the heat exchanger. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \tag{III}$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O + CO \rightarrow H_2 + CO_2 \tag{IV}$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° C. to about 600° C. and can include transition metal oxides such as ferric oxide or chromic oxide, and optionally including a promoter such as copper or iron silicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F' is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F'. The oxygen is consumed by the reactions of process step G described below. The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO + 1/2 O_2 \rightarrow CO_2 \quad (V)$$

$$H_2 + 1/2 O_2 \rightarrow H_2O \quad (VI)$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with of higher and lower levels of carbon monoxide.

The effluent P exiting the fuel processor is a hydrogen rich gas containing carbon dioxide and other constituents which may be present such as water, inert components (e.g., nitrogen, argon), residual hydrocarbon, etc. Product gas P may be used as the feed for a fuel cell or for other applications where a hydrogen rich feed stream is desired. Optionally, product gas may be sent on to further processing, for example, to remove the carbon dioxide, water or other components.

Figure 2:
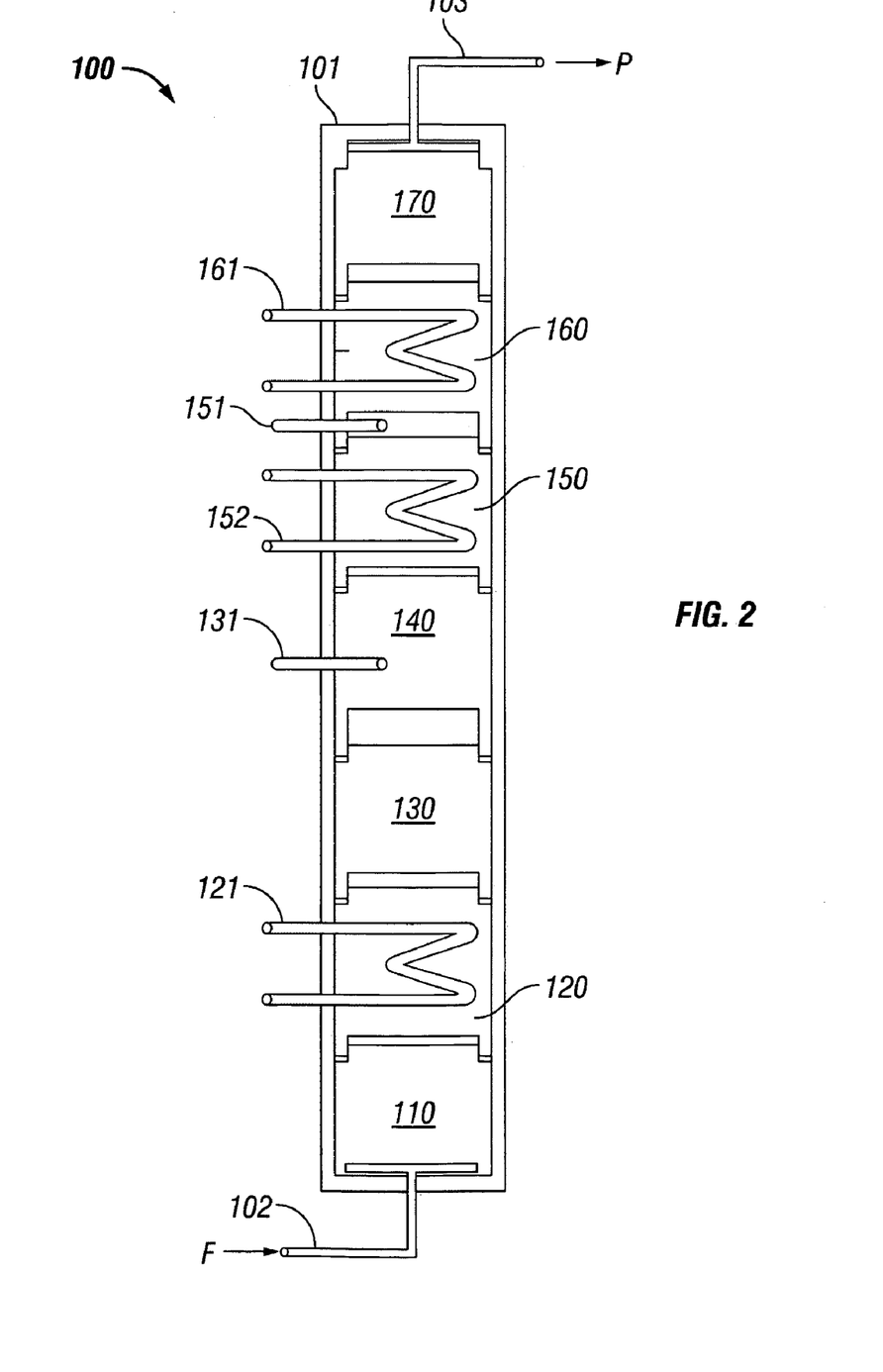
FIG. 2 is a diagrammatic illustration of a compact fuel processor utilizing stacked modules.

In one type of a compact fuel processor, the fuel processor is of modular construction with individual modular units, which are separable, rearrangeable, and individually replaceable. Whereas a compact fuel processor may take many forms, FIG. 2 is illustrative of the concept. One of skill in the art should readily understand that the embodiments of the present invention are readily applicable to numerous compact fuel processor designs, and that the compact fuel processor described below and in FIG. 2 merely demonstrates the concept of the compact unit. Referring to FIG. 2, the compact fuel processor 100 includes a series of individual modules (110, 120, 130, 140, 150, 160 and 170). The modular units may be used in any orientation, e.g., vertical or horizontal orientation, and is adapted to be used in conjunction with a fuel cell such that the hydrogen rich product gas of the reactor described herein is supplied directly to a fuel cell as a feed stream. While the modules can have any cross sectional configuration, such as circular, rectangular, triangular, etc., a circular cross section is preferred with the fuel processor 100 being of a generally tubular shape.

The modules can be fabricated from any material capable of withstanding the operating conditions and chemical environment of the reactions described herein and can include, for example, stainless steel, Inconel, Incoloy, Hastelloy, and the like. The reaction pressure is preferable from about 0 to about 100 psig, although higher pressures may be employed. The operating pressure of the fuel processor depends upon the delivery pressure required by the fuel cell. For fuel cells operating in the 1 to 20 kW range an operating pressure of 0 to about 100 psig is generally sufficient. The modules are of such dimensions so as to safely contain the reaction at the desired operating pressures and temperatures.

Compact fuel processor 100 as shown in FIG. 2 effects the process diagrammatically illustrated in FIG. 1. Feed stream F is introduced through inlet pipe 102 and product gas P is drawn off via outlet pipe 103. Compact fuel processor 100 includes several modules that may be stacked to form a modular assembly 101 that can be modified by the replacement of individual modules. Each module performs a separate operational function and is generally configured as shown in FIG. 2. Module 110 is the autothermal reforming module corresponding to process step A of FIG. 1. Module 120 is a cooling step corresponding to process step B of FIG. 1. In this illustrative embodiment, heat exchanger 121 is shown as a general heat sink for Module 120. Module 130 is a purifying module corresponding to process step C of FIG. 1. Module 140 is a mixing step corresponding to process step D of FIG. 1. Feed nozzle 131 provides an optional water stream feed to Module 140 to aid in driving the water gas shift reaction (Equation IV) of Module 150. Module 150 is a water gas shift module corresponding to process step E of FIG. 1. Feed nozzle 151 provides a source for oxygen to process gas for the oxidation reaction (Equation V) of Module 170. In this compact fuel processor, heat exchanger 152 is shown as a general heat sink for Module 150. Module 160 is a cooling step corresponding to process step F of FIG. 1. In this compact fuel processor, heat exchanger 161 is shown as a general heat sink for Module 160. Module 170 is an oxidation step corresponding to process step G of FIG. 1.

Figure 3A:
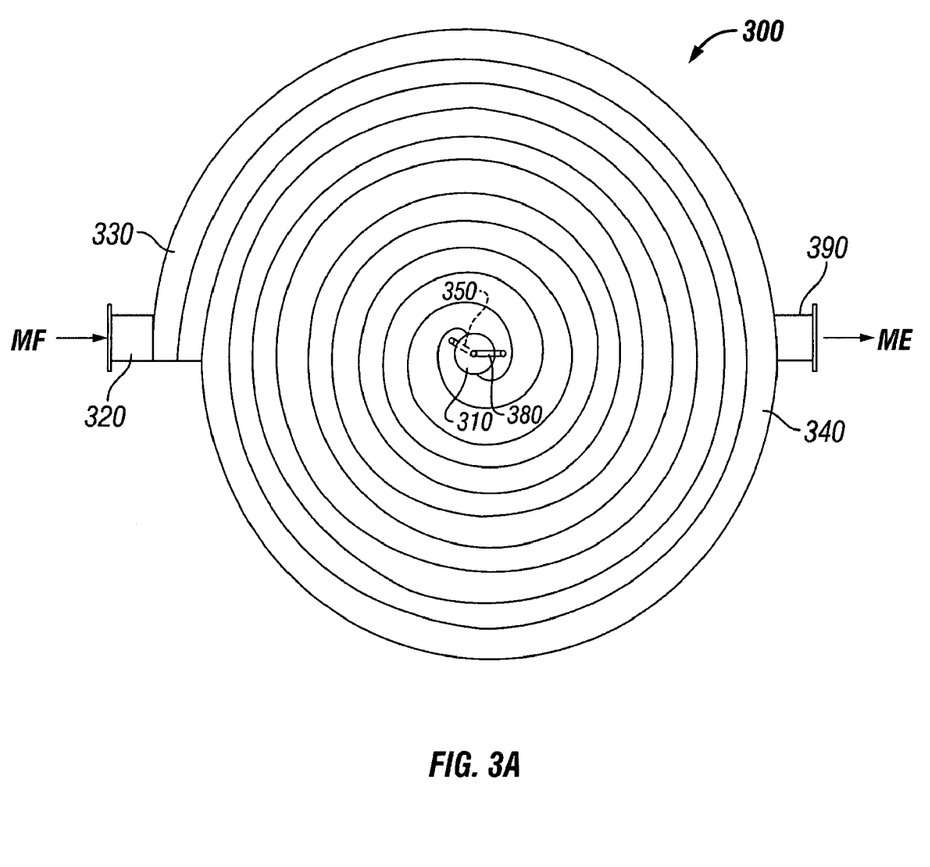
FIG. 3A depicts an overhead cross-sectional view of an illustrative embodiment of a reactor module of the present invention.
Figure 3B:
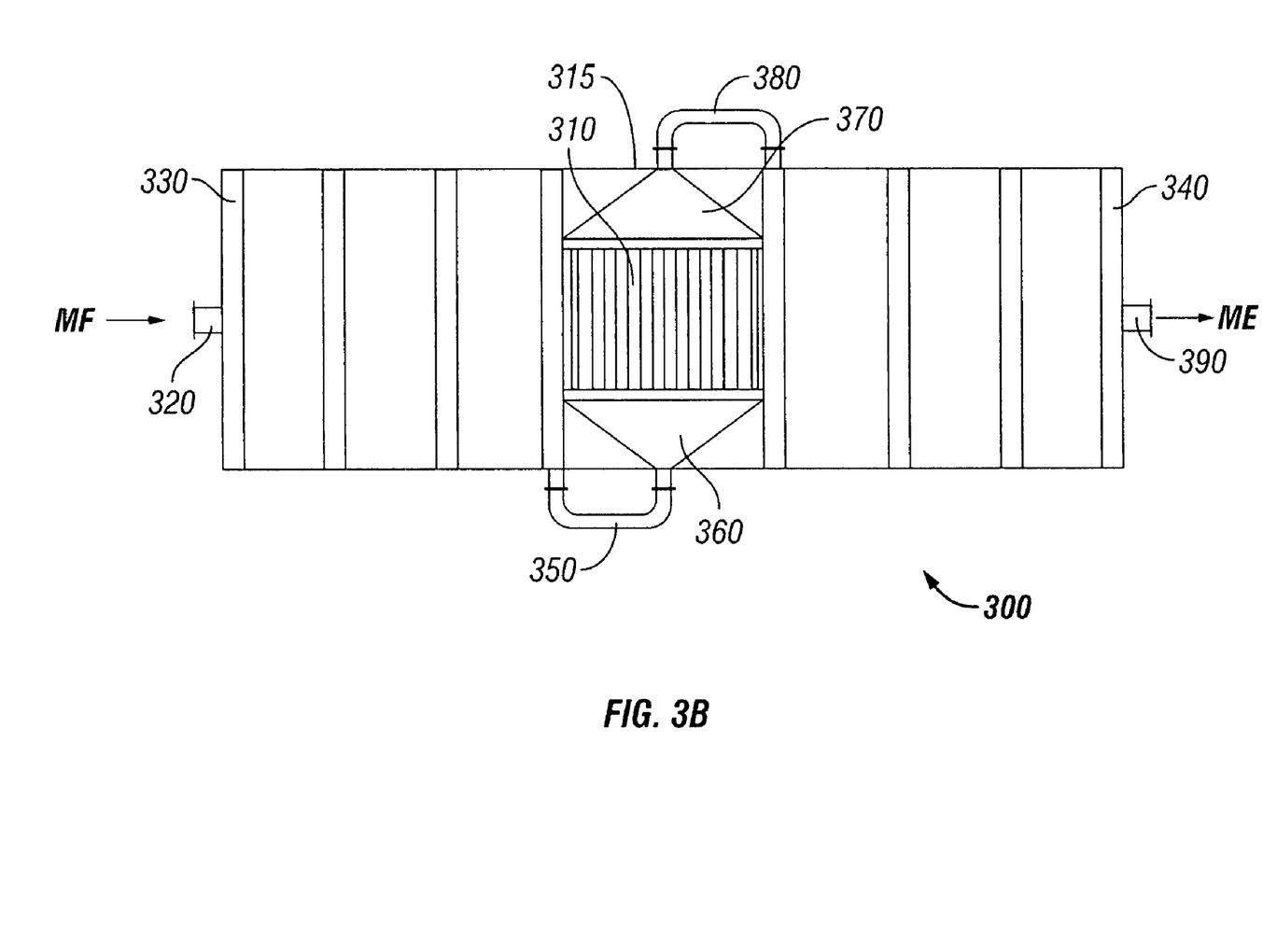
FIG. 3B depicts a side cross-sectional view of an illustrative embodiment of a reactor module of the present invention

Referring now to FIGS. 3A and 3B, the present invention relates to a reactor module for use with a compact fuel processor such as the one depicted in FIG. 2 or with other compact fuel processor designs. A reactor module consistent with the present invention consists essentially of a spiral heat exchanger with a fixed bed reactor located in the core of the spiral heat exchanger. In order to maximize heat transfer in a typical spiral heat exchanger design, hot fluid is introduced into the core of the unit and spirals outward toward the outside channel, while the cold fluid enters the unit at the outside channel and spirals towards the core. Countercurrent flow is usually employed between the hot and cold channels in a spiral exchanger to maximize heat transfer. The present invention takes advantage of this type of heat exchange to preheat a reactor feed with the hot reactor effluent produced by a reactor bed located at the core of the spiral exchanger. This design results in lower pressure drops, higher energy efficiency, short flow paths, and creates a compact modular design consistent with a compact fuel processor.

FIG. 3A illustrates an overhead cross-sectional view of one illustrative embodiment of such a reactor module. FIG. 3B illustrates a side cross-sectional view of one illustrative embodiment of such a reactor module. Reactor module 300 consists essentially of a spiral exchanger with a fixed bed reactor 310 located in the core of the spiral exchanger. The spiral heat exchanger portion of the module is composed of two long, flat plates wrapped around the reactor core, creating two concentric spiral channels—an inlet spiral passage 330 and an outlet spiral passage 340. The channels are seal-welded on alternate sides to provide a sturdy barrier between the fluids. A cover 315 is fitted on each side, and a full-faced gasket is positioned between each cover and spiral element to prevent leaks.

Module feed MF enters reactor module 300 at module inlet nozzle 320, is introduced into inlet spiral passage 330, and proceeds through inlet spiral passage 330 to reactor inlet piping 350. A flow distribution manifold 360 is utilized to evenly distribute flow into reactor 310. Reactor 310 may be any type of exothermic reactor as previously described, including but not limited to an autothermal reforming reactor as in process step A of FIG. 1, a desulfurization reactor as in process step C of FIG. 1, a water gas shift reactor as in process step E of FIG. 1, or an oxidation reactor as in process step G of FIG. 1. The reactor may be a fixed bed reactor containing supported catalyst particles or the reactor bed may be a monolith with catalytic material coated on to the surface of the structural members, the choice of catalyst being a design decision consistent with the considerations discussed previously regarding the process steps of FIG. 1.

A flow collection manifold 370 is utilized to direct the hot reactor product to the reactor outlet piping 380. From there, the hot product gases proceed through the outlet spiral passage, and ultimately the cooled module effluent ME is produced from the module outlet nozzle 390. Such an apparatus as described herein can be designed by one skilled in the art to effectively and efficiently preheat the module feed MF to the appropriate reaction temperature before entering the reactor while cooling the hot reaction product to an appropriate temperature for further processing in the fuel processor. Module 300 in this illustrative embodiment shows the spiraling relationship between the inlet spiral passage 330 and the outlet spiral passage 340, but one of skill in the art should appreciate that the extent of spiraling utilized in the present invention is a design consideration unique to the reaction and operating conditions of each specific module.

Such a skilled person in the art should also appreciate that the present invention encompasses the following illustrative embodiments. One such illustrative embodiment includes a reactor module for use in a compact fuel processor having both a reactor and a heat integrating heat exchanger contained in the same module. In this embodiment, the module feed stream is introduced to the module inlet and is preheated in the heat exchanger against the hot reactor product prior to being introduced to the reactor inlet. A cooled module effluent is then produced from the module outlet for further processing in the fuel processor. The reactor may be any type of exothermic reactor as previously described, including but not limited to an autothermal reforming reactor as in process step A of FIG. 1, a desulfurization reactor as in process step C of FIG. 1, a water gas shift reactor as in process step E of FIG. 1, or an oxidation reactor as in process step G of FIG. 1. The reactor may be a fixed bed reactor containing supported catalyst particles or the reactor bed may be a monolith with catalytic material coated on to the surface of the structural members, the choice of catalyst being a design decision consistent with the previous discussions regarding the process steps FIG. 1 supra.

Another illustrative embodiment of the present invention is a reactor module for use in a compact fuel processor having a module inlet for receiving a feed stream, a module outlet for producing an effluent stream, a reactor having a reactor inlet, a reactor outlet, and catalyst, an inlet spiral passage in fluid communication with the module inlet to the reactor inlet, and an outlet spiral passage in fluid communication with the reactor outlet to the module outlet. Such a design provides for the feed stream to be introduced to the module inlet, where it then passes through the inlet spiral passage, and is heated by hot reactor product passing through the outlet spiral passage. The reactor may be any type of exothermic reactor as previously described, including by not limited to an autothermal reforming reactor as in process step A of FIG. 1, a desulfurization reactor as in process step C of FIG. 1, a water gas shift reactor as in process step E of FIG. 1, or an oxidation reactor as in process step G of FIG. 1. The reactor may be a fixed bed reactor containing supported catalyst particles or the reactor bed may be a monolith with catalytic material coated on to the surface of the structural members, the choice of catalyst being a design decision consistent with the previous discussions regarding the process steps of FIG. 1 supra. Furthermore, a flow distribution manifold can be connected to the reactor inlet for evenly distributing flow into the reactor. Likewise, a flow collection manifold can be connected to the reactor for directing the hot reactor product to the reactor outlet.

Yet another illustrative embodiment of the present invention is an autothermal reforming module for use in a compact fuel processor having a module inlet for receiving a feed stream, a module outlet for producing an effluent stream, a fixed bed reactor having a reactor inlet, a reactor outlet, and autothermal reforming catalyst, an inlet spiral passage in fluid communication with the module inlet to the reactor inlet, an outlet spiral passage in fluid communication with the reactor outlet to the module outlet, a flow distribution manifold in fluid communication with the reactor inlet for evenly distributing flow into the reactor, and a flow collection manifold in fluid communication with the reactor for directing hot reactor product to the reactor outlet. Such a design provides for the feed stream to be introduced to the module inlet, where it then passes through the inlet spiral passage, and is heated by hot reactor product passing through the outlet spiral passage. The reactor may be a fixed bed reactor containing supported catalyst particles or the reactor bed may be a monolith with catalytic material coated on to the surface of the structural members. The autothermal reforming catalyst may include a partial oxidation catalyst and optionally a steam reforming catalyst depending on the nature of the reforming desired by the user. In such a design, the module feed stream is expected to be a gaseous mixture of air, steam, and hydrocarbon fuel.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An autothermal reforming module for use in a compact fuel processor, comprising:
   a module inlet for receiving a feed stream;
   a module outlet for producing an effluent stream;
   a fixed bed reactor having a reactor inlet, a reactor outlet, and autothermal reforming catalyst;
   an inlet spiral passage in fluid communication with the module inlet to the reactor inlet;
   an outlet spiral passage in fluid communication with the reactor outlet to the module outlet;
   a flow distribution manifold in fluid communication with the reactor inlet for evenly distributing flow into the reactor;
   a flow collection manifold in fluid communication with the reactor for directing hot reactor product to the reactor outlet; and
   a cover fitted to a side of the reforming module;
   wherein the flow distribution manifold is disposed between the reactor and the cover for evenly distributing flow into the reactor; and wherein the feed stream is introduced to the module inlet, passes through the inlet spiral passage, and is heated by the hot reactor product passing through the outlet spiral passage.

2. The autothermal reforming module described in claim 1, wherein the autothermal reforming catalyst includes supported catalyst particles.

3. The autothermal reforming module described in claim 1, wherein the autothermal reforming catalyst includes monoliths.

4. The autothermal reforming module described in claim 1, wherein the autothermal reforming catalyst includes a partial oxidation catalyst.

5. The autothermal reforming module described in claim 4, wherein the autothermal reforming catalyst includes a steam reforming catalyst.

6. The autothermal reforming module described in claim 1, wherein the feed stream is a mixture of air, steam, and hydrocarbon fuel.

7. A module for use in a compact fuel processor, comprising:
   a module inlet for receiving a feed stream;
   an inlet spiral passage in fluid communication with the module inlet;
   a flow distribution manifold in fluid communication with the inlet spiral passage and a reactor inlet;
   a reactor having a reactor inlet, a reactor outlet, and catalyst;
   an outlet spiral passage in fluid communication with the reactor outlet;
   a module outlet in fluid communication with the outlet spiral passage for producing an effluent stream; and
   a cover fitted to a side of the module;
   wherein the flow distribution manifold is disposed between the reactor and the cover for evenly distributing flow into the reactor and wherein the feed stream is introduced to the module inlet, passes through the inlet spiral passage, and is heated by hot reactor product passing through the outlet spiral passage.

8. The module of claim 7, further comprising a flow collection manifold in fluid communication with the reactor outlet for directing a hot reactor product to the outlet spiral passage.

9. A module for use in a compact fuel processor, comprising:
   a module inlet for receiving a feed stream;
   an inlet spiral passage in fluid communication with the module inlet;
   a reactor inlet piping in fluid communication with the inlet spiral passage;
   a flow distribution manifold in fluid communication with the reactor inlet piping;
   a reactor having a reactor inlet in fluid communication with the flow distribution manifold, a reactor outlet, and catalyst;
   an outlet spiral passage in fluid communication with the reactor outlet; and
   a module outlet in fluid communication with the outlet spiral passage for producing an effluent stream.

10. The module of claim 9, further comprising:
    a flow collection manifold in fluid communication with the reactor outlet; and
    a reactor outlet piping in fluid communication with the flow collection manifold and the outlet spiral passage.

11. A module for use in a compact fuel processor, comprising:
    a module inlet for receiving a feed stream;
    an inlet spiral passage in fluid communication with the module inlet;
    a flow distribution manifold in fluid communication with the inlet spiral passage;
    a reactor having a reactor inlet in fluid communication with the flow distribution manifold, a reactor outlet, and catalyst;
    an outlet spiral passage in fluid communication with the reactor outlet; and
    a module outlet in fluid communication with the outlet spiral passage for producing an effluent stream;
    wherein the module has a circular cross sectional configuration and the flow distribution manifold is centrally disposed for evenly distributing flow into the reactor.

12. The module of claim 11, further comprising a flow collection manifold in fluid communication with the reactor outlet and wherein the flow collection manifold is centrally disposed.

13. The module of claim 11, further comprising a reactor inlet piping providing fluid communication between the inlet spiral passage and the flow distribution manifold.

* * * * *